(12) United States Patent
Wang et al.

(10) Patent No.: US 10,217,194 B2
(45) Date of Patent: Feb. 26, 2019

(54) IMAGE SHOOTING APPARATUS THAT EXTENDS DEPTH OF FIELD BY RECOVERING BLURRED IMAGE AND AN IMAGE SHOOTING METHOD THEREOF

(71) Applicant: OMRON Corporation, Kyoto (JP)

(72) Inventors: Ying Wang, Kyoto (JP); Shinya Matsumoto, Osaka (JP); Tuo Zhuang, Kawasaki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/384,324

(22) Filed: Dec. 20, 2016

(65) Prior Publication Data

US 2017/0213325 A1 Jul. 27, 2017

(30) Foreign Application Priority Data

Jan. 21, 2016 (JP) ................................. 2016-010094

(51) Int. Cl.
*G06T 5/00* (2006.01)
*G06T 5/10* (2006.01)
(Continued)

(52) U.S. Cl.
CPC .............. *G06T 5/003* (2013.01); *G06T 5/10* (2013.01); *G06T 5/20* (2013.01); *H04N 5/2253* (2013.01);
(Continued)

(58) Field of Classification Search
CPC . G06T 2207/10024; G06T 2207/22032; G06T 5/003; G06T 5/10; G06T 5/20;
(Continued)

(56) References Cited

U.S. PATENT DOCUMENTS

2008/0080019 A1* 4/2008 Hayashi ............... H04N 5/3572
358/474
2010/0215219 A1 8/2010 Chang et al.
(Continued)

FOREIGN PATENT DOCUMENTS

JP 2011-120309 6/2011
JP 2011135563 7/2011
(Continued)

OTHER PUBLICATIONS

"Comprehensive List of Panasonic Digital Cameras 2015 Autumn and Winter," Panasonic Corporation, Sep. 2015, with Partial English Translation thereof, pp. 1-33.
(Continued)

*Primary Examiner* — Amy R Hsu
(74) *Attorney, Agent, or Firm* — JCIPRNET

(57) ABSTRACT

The invention provides an image shooting apparatus and an image shooting method that obtain a recovered image with high precision by using an optimal point spread function (PSF) without deriving an image shooting distance of a photographed object, an image shooting program, and a recording medium that records the image shooting program. An image shooting apparatus includes an optical system, an image shooting element configured behind the optical system; an image recovery processing portion configured to perform image processing and recovery processing on obtained image data; and a recovered image output portion configured to output a recovered image; and the image recovery processing portion includes a recovery filter storage memory configured to store multiple recovery filters pre-manufactured by using multiple point spread functions; a recovery filter processing portion configured to obtain multiple middle candidate images; and an image comment
(Continued)

portion configured to output a middle candidate image with an optimal profile.

8 Claims, 20 Drawing Sheets

(51) Int. Cl.
    *G06T 5/20*     (2006.01)
    *H04N 5/225*     (2006.01)
    *H04N 5/232*     (2006.01)
    *H04N 5/235*     (2006.01)
    *H04N 5/378*     (2011.01)

(52) U.S. Cl.
    CPC ......... *H04N 5/2254* (2013.01); *H04N 5/2351* (2013.01); *H04N 5/23212* (2013.01); *H04N 5/23225* (2013.01); *H04N 5/23229* (2013.01); *H04N 5/378* (2013.01); *G06T 2207/10024* (2013.01); *G06T 2207/20032* (2013.01)

(58) Field of Classification Search
    CPC ............... H04N 5/2253; H04N 5/2254; H04N 5/23229; H04N 5/23267; H04N 5/378; H04N 9/69
    See application file for complete search history.

(56) References Cited

U.S. PATENT DOCUMENTS

| | | | | |
|---|---|---|---|---|
| 2010/0296749 | A1* | 11/2010 | Kikuchi | G06T 5/003 382/255 |
| 2011/0242373 | A1* | 10/2011 | Inoue | H04N 5/3572 348/242 |
| 2013/0050540 | A1* | 2/2013 | Kano | H04N 9/045 348/241 |
| 2013/0321679 | A1* | 12/2013 | Lim | H04N 5/23229 348/256 |
| 2013/0322752 | A1* | 12/2013 | Lim | G06T 5/20 382/167 |
| 2014/0375847 | A1* | 12/2014 | Kasahara | H04N 5/357 348/241 |
| 2015/0296193 | A1* | 10/2015 | Cote | H04N 9/646 382/167 |
| 2015/0317776 | A1* | 11/2015 | Sugimoto | H04N 5/357 348/241 |
| 2016/0098819 | A1* | 4/2016 | Sugimoto | H04N 5/23206 382/260 |
| 2016/0284061 | A1* | 9/2016 | Kano | G06T 5/003 |
| 2016/0371821 | A1* | 12/2016 | Hayashi | H04N 5/3572 |

FOREIGN PATENT DOCUMENTS

| | | |
|---|---|---|
| JP | 2011215707 | 10/2011 |
| JP | 2013-162369 | 8/2013 |
| JP | 2013186355 | 9/2013 |
| JP | 2015-005933 | 1/2015 |
| WO | 2015015935 | 2/2015 |
| WO | 2015064264 | 5/2015 |
| WO | 2015090611 | 6/2015 |

OTHER PUBLICATIONS

Hong-Nan Wang, et al., "Research of Measurement for Digital Image Definition," Journal of Image and Graphics, vol. 9, No. 7, Jul. 2004, with Partial English Translation thereof, pp. 1-5.

"Search Report of Europe Counterpart Application", dated Jul. 24, 2017, p. 1-p. 10.

"Office Action of Japan Counterpart Application," dated Jan. 8, 2019,with English translation thereof, p. 1-p. 11.

* cited by examiner

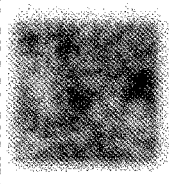
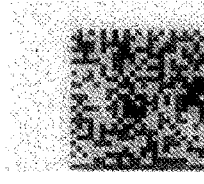
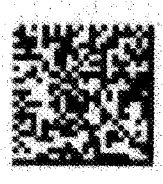
FIG. 13B FIG. 13D FIG. 13F
Location separated from the accurate focus location
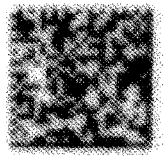
FIG. 13A FIG. 13C FIG. 13E
Accurate focus location ID SHOOTING APPARATUS THAT
EXTENDS DEPTH OF FIELD BY
RECOVERING BLURRED IMAGE AND AN
IMAGE SHOOTING METHOD THEREOF

CROSS-REFERENCE TO RELATED
APPLICATION

This application claims the priority benefit of Japanese application serial no. 2016-010094, filed on Jan. 21, 2016. The entirety of the above-mentioned patent application is hereby incorporated by reference herein and made a part of this specification.

BACKGROUND OF THE INVENTION

1. Field of the Invention

The invention relates to an image shooting apparatus, an image shooting method, an image shooting program, and a recording medium that records the image shooting program, in particular, to an image shooting apparatus and an image shooting method that extend a depth of field by recovering a blurred image, an image shooting program, and a recording medium that records the image shooting program.

2. Description of Related Art

Previously, in special image shooting apparatuses that extend depths of field, for example, by means of wavefront coding (Wavefront Coding, WFC) of optical apparatuses, image recovery needs to be performed in a particular design range.

However, if an image shooting distance is separated from a focus location, then a point spread function (PSF: Point spread function, which changes slightly every particular distance) actually applied to an original image deviates from a PSF used for image recovery (using a fixed PSF at the focus location), and therefore maintenance of recovery precision the same as the focus location cannot be implemented. That is, the PSF actually applied to the original image is not fixed due to the image shooting distance, and therefore profile deterioration of a recovered image is generated.

In patent document 1 or patent document 2, a distance is calculated by using a distance detection sensor or multiple image shooting portions, and recovery processing is performed based on PSF data corresponding to each distance obtained by rough estimation.

In patent document 3, a recovery filter that minimizes a mean square error of a frequency domain is designed in consideration of all PSFs corresponding to multiple defocusing locations.

In addition, non-patent document 1 discloses a technology called "auto focus (auto focus, AF)" carried in digital cameras that start to be sold by Panasonic (Panasonic) Corporation since April, 2014. In the technology, a depth from defocus (Depth from Defocus, DFD) of a distance is calculated based on analysis according to a blur quantity; after a distance from two images to a photographed object is calculated, a blur model is derived to make a focus image.

Non-patent document 2 discloses calculation of sharpnesses of images.

PRIOR ART DOCUMENTS

Patent Documents

[Patent document 1] JP Patent Publication No. 2011-120309 gazette

[Patent document 2] JP Patent Publication No. 2013-162369 gazette

[Patent document 3] JP Patent Publication No. 2015-005933 gazette

Non-Patent Documents

[Non-patent document 1] "Comprehensive List of Panasonic (Panasonic) Digital Cameras 2015/Autumn and Winter", Panasonic Corporation, September, 2015, p. 21

[Non-patent document 2] Research of Measurement for Digital Image Definition, WANG HongNan, et al., Journal of Image and Graphics (Research of Measurement for Digital Image Definition, WANG HongNan, . . . , etc, Journal of Image and Graphics), vol. 9, no. 7, 2004

SUMMARY OF THE INVENTION

Problems to be Resolved by the Invention

However, in the prior art disclosed by patent document 1 or patent document 2, for each photographed object included in data of each photographed image, if distance information cannot be correctly derived, then accurate PSF data cannot be used, and therefore optimal recovery processing cannot be performed. Therefore, the problem of cost raise due to a distance detection sensor or multiple image shooting portions needed by calculation of an image shooting distance exists.

In addition, in the prior art disclosed in patent document 3, because average processing is performed, distance information is not needed. However, the following problem exists, that is, due to PSF data differences at multiple locations, even if optimal recovery processing in the sense of a mean square error is performed, the precision is also poor compared with a recovery result obtained by using a PSF corresponding to an image shooting distance.

In view of such a problem of the prior art, an objective of the invention lies in providing an image shooting apparatus and an image shooting method that obtain a recovered image with high precision by using an optimal PSF without deriving an image shooting distance of a photographed object, an image shooting program, and a recording medium that records the program.

Means for Solving the Problems

To achieve the objective, the image shooting apparatus of the invention is characterized by including: an optical system, including one or more than one lenses or the lens and an optical element; an image shooting element, configured at a location further to the rear of the optical system; an image recovery processing portion, configured to perform image processing and recovery processing on image data obtained by the image shooting element; and a recovered image output portion, configured to output an image recovered by the image recovery processing portion; and the image recovery processing portion includes: a recovery filter storage portion, configured to store multiple recovery filters pre-manufactured by using multiple point spread functions (PSF) corresponding to multiple different distances; a recovery filter processing portion, configured to obtain multiple middle candidate images respectively recovered by using the multiple recovery filters according to the image data; and an image comment portion, configured to separately comment on profiles of the multiple candidate images to output an optimal middle candidate image as a recovery processing result.

Herein, an objective of the optical system lies in extending a depth of field, as long as the PSF is used to perform recovery. The lens may be either a spherical lens or a non-spherical lens, or a suitable combination may be performed in a case in which there are multiple lenses. The optical element, for example, may be a light diffusion plate, a phase plate, or a diffraction grating. However, the invention is not limited thereto.

The image recovery processing portion may further include: an image area designation portion, configured to designate an image area, used as an object, in the recovery filter processing portion; and an excluded area designation portion, configured to designate an area, which should be excluded from the object by the image comment portion. In addition, the image recovery processing portion may also synthesize recovered images categorized by color signals for the color signals. In addition, the image recovery processing portion may also include a frequency-time filter, an image-space filter, and a time-space filter, for example, a Wiener (Wiener) filter or a finite impulse response (Finite Impulse Response, FIR) filter manufactured by patterns, incident to the image shooting element by means of diffusion, of a point image function.

In addition, the image shooting apparatus of the invention is characterized by including: an optical system, including one or more than one lenses or the lens and an optical element; an image shooting element, configured at a location further to the rear of the optical system; an image recovery processing portion, configured to perform image processing and recovery processing on image data obtained by the image shooting element; and a recovered image output portion, configured to output an image recovered by the image recovery processing portion; and the image recovery processing portion includes: a recovery filter storage portion, configured to store standard registration images and image sharpnesses corresponding thereto and multiple recovery filters pre-manufactured by using multiple point spread functions corresponding to multiple different distances; and an image comment portion, configured to select a recovery filter corresponding to a closest image sharpness from the recovery filter storage portion based on image sharpnesses obtained by commenting on a profile of the image data; and a recovery filter processing portion, configured to obtain a recovered image by using the selected recovery filter.

In addition, the image shooting method of the invention is characterized by including: an image shooting process: photographing a photographed object; and an image recovery processing process: performing image processing and recovery processing on image data obtained in the image shooting process; and the image recovery processing process includes: a recovery filter storage process: storing multiple recovery filters pre-manufactured by using multiple point spread functions corresponding to multiple different distances; a recovery filter processing process: obtaining multiple middle candidate images respectively recovered by using the multiple recovery filters according to the image data; and an image comment process: separately commenting on profiles of the multiple candidate images to output an optimal middle candidate image as a recovery processing result.

In addition, the image shooting method of the invention is characterized by including: an image shooting process: photographing a photographed object; and an image recovery processing process: performing image processing and recovery processing on image data obtained in the image shooting process; and the image recovery processing process includes: a recovery filter storage process: storing standard registration images and image sharpnesses corresponding thereto and multiple recovery filters pre-manufactured by using multiple point spread functions corresponding to multiple different distances; and an image comment process: selecting a recovery filter corresponding to a closest image sharpness based on image sharpnesses obtained by commenting on a profile of the image data; and a recovery filter processing process: obtaining a recovered image by using the selected recovery filter.

Or the image shooting program of the invention is characterized by enabling a computer to execute the image shooting method.

According to the image shooting program formed in this way, the image shooting method of the invention may be implemented by using a computer that can execute a program.

Or the recording medium that records the image shooting program of the invention is a computer readable recording medium, characterized by recording the image shooting program.

According to the recording medium that records the image shooting program formed in this way, the image shooting method of the invention can be easily implemented in various scenarios or environments, and the recording medium can be provided at a low lost, thereby improving usefulness of the image shooting method of the invention.

Effects of the Invention

By means of the image shooting apparatus of the invention, a recovered image with high precision may be obtained by using an optimal point spread function without cost raise due to parts needed by derivation of an image shooting distance of a photographed object.

According to the image recovery method of the invention, a recovered image with high precision may be obtained by using an optimal point spread function without deriving an image shooting distance of a photographed object.

According to the image shooting program of the invention, the image shooting method of the invention may be implemented by using a computer that can execute a program.

According to the recording medium that records the image shooting program of the invention, the image shooting method of the invention can be easily implemented in various scenarios or environments, and the recording medium can be provided at a low lost, thereby improving usefulness of the image shooting method of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A is a recovered image with high precision. FIG. 3B is a recovered image with artifacts (Artifact). FIG. 3C is a recovered image with blurs.

FIG. 10A is a histogram of image brightness values of a recovered image generally without artifacts. FIG. 10B is a histogram of image brightness values of a recovered image with artifacts.

FIG. 13A to FIG. 13F are diagrams of blurred images respectively shot at an accurate focus location and at a location separated from the accurate focus location in a comparative example, a recovered image of an existing method, and a recovered image of the invention.

DESCRIPTION OF THE EMBODIMENTS

Figure 1:
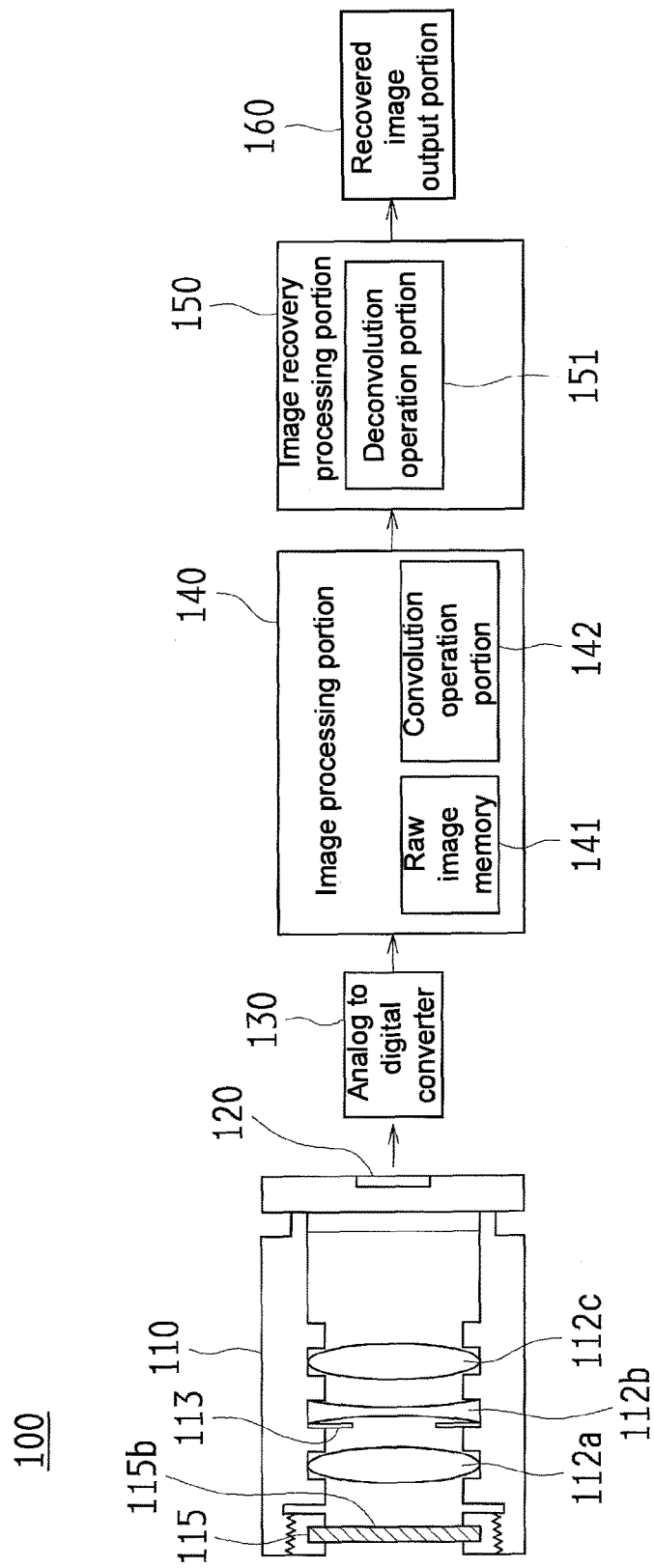
FIG. 1 is a block diagram that illustrates composition of an image shooting apparatus 100 of implementation manner 1 of the invention.

Reference will now be made in detail to the present preferred embodiments of the invention, examples of which are illustrated in the accompanying drawings. Wherever possible, the same reference numbers are used in the drawings and the description to refer to the same or like parts.

<Implementation Manner 1>

FIG. 1 is a block diagram that illustrates composition of an image shooting apparatus 100 of implementation manner 1 of the invention. Further, in the following description, a side of incidence of light to an optical system 110 is called "front surface" (the left side in the drawing), and a side of emission of light from the optical system 110 is called "rear surface" (the right side in the drawing).

As shown in FIG. 1, the image shooting apparatus 100 includes: an optical system 110; an image shooting element 120, configured at a location further to the rear of the optical system 110; an analog to digital (analog to digital, A/D) converter 130, configured to convert an analog signal output from the image shooting element 120 into a digital signal; an image processing portion 140, which includes an original (RAW) image memory 141 and a convolution operation portion 142, and performs image processing on image data of the digital signal output from the A/D converter 130; an image recovery processing portion 150, which includes a deconvolution operation portion 151, and performs recovery processing on image data obtained after the image processing is performed by the image processing portion 140; and a recovered image output portion 160, configured to output an image recovered by the image recovery processing portion 150.

The optical system 110 includes a lens 112a to a lens 112c, a diaphragm 113 configured directly in front of a second lens 112b, and a light diffusion plate 115 configured at a location further to the front of the first lens 112a.

Herein, the first lens 112a and the third lens 112c are set as convex lenses, and the second lens 112b is set as a concave lens. However, the invention is not limited to this combination, as long as a quantity of entire lenses is two or more than two, and the quantity is not necessarily limited to three. In addition, the lens may be either a spherical lens or a non-spherical lens. A suitable combination may be performed in a case in which there are multiple lenses. The light diffusion plate 115 is an optical element, which may also be another optical element, for example, a phase plate, or a diffraction element. A location where the optical element is configured is not limited to the location further to the front of the first lens 112a, and may be, for example, a location behind the third lens 112c.

The diaphragm 113 is an aperture diaphragm, but a location where the diaphragm 113 is configured is not necessarily limited to the location shown in the drawing.

A front surface of the light diffusion plate 115 is a plane, and a rear surface thereof becomes a diffusion surface 115b. A location where the light diffusion plate 115 is configured is not necessarily limited to the location shown in the drawing, and may be a location behind the third lens 112c.

The image shooting element 120 may be a charge coupled device (charge coupled device, CCD) sensor, a complementary metal oxide semiconductor (complementary metal oxide semiconductor, CMOS) sensor, a metal oxide semiconductor (metal oxide semiconductor, MOS) sensor, and the like, but the invention is not limited thereto. When the image shooting element 120 can directly output a digital signal rather than an analog signal, the A/D converter 130 may be omitted.

The image processing portion 140 and the image recovery processing portion 150 do not necessarily need to be independent, and may also be combined together.

In the deconvolution operation portion 151 of the image recovery processing portion 150, for example, operation may also be performed by using a Wiener filter, or an FIR filter, but the invention is not limited to these filters.

Figures 2A, 2B:
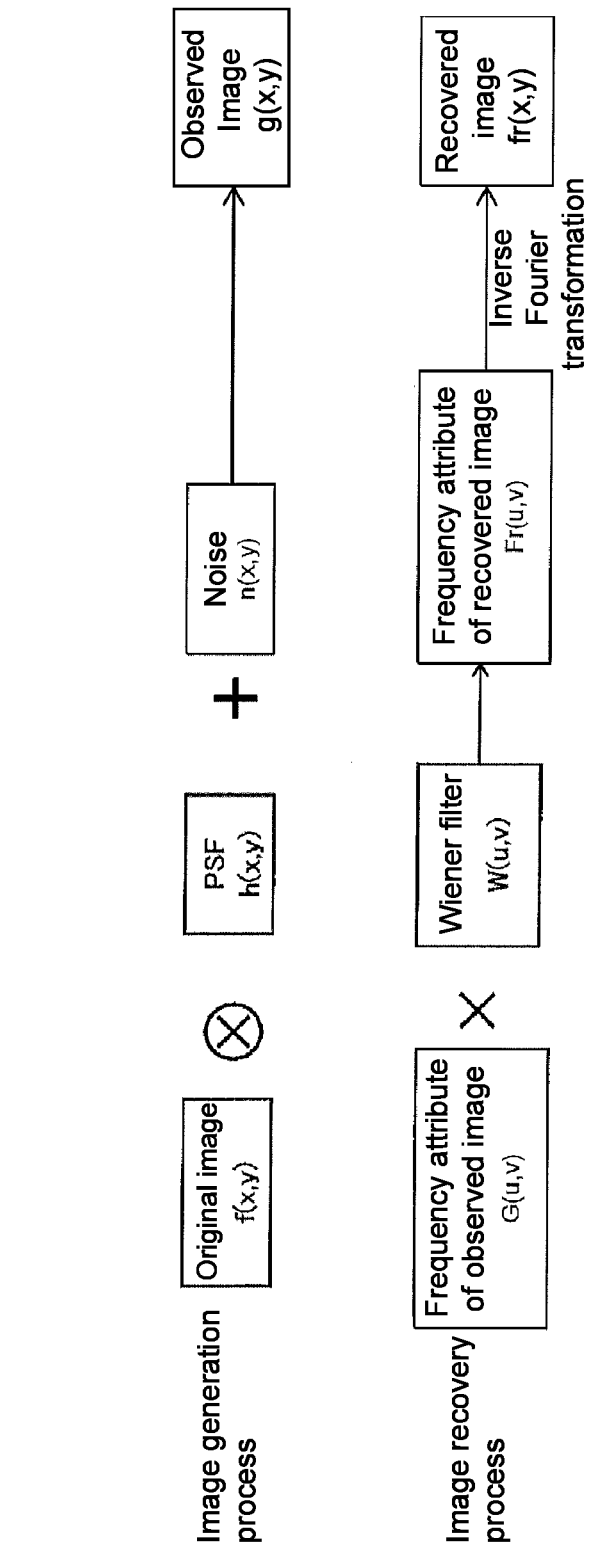
FIG. 2A is a schematic diagram that illustrates an image generation process and an image recovery process of an image shooting apparatus 100.
FIG. 2B is a formula that illustrates a Wiener filter.
Figure 3C:
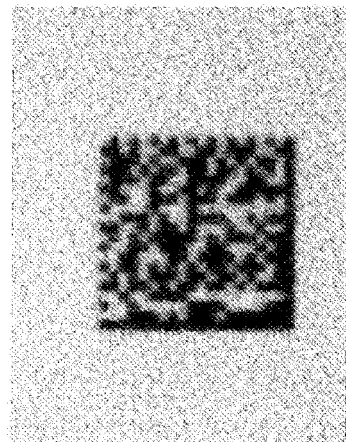
FIG. 3A to FIG. 3C are explanatory diagrams about a relationship between a recovery-purpose PSF and precision of a recovered image.
Figure 3B:
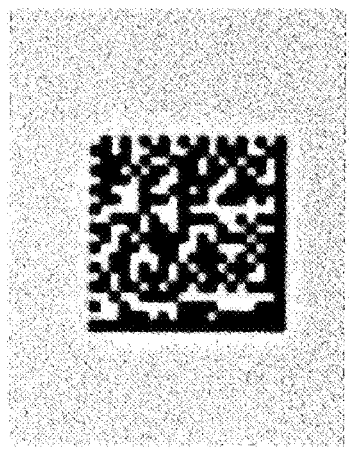
Figure 3A:
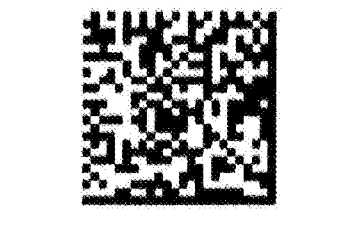

FIG. 2A is a schematic diagram that illustrates an image generation process and an image recovery process of the image shooting apparatus 100. FIG. 2B is a formula that illustrates a Wiener filter. FIG. 3A to FIG. 3C are explanatory diagrams about a relationship between a recovery-purpose PSF and precision of a recovered image. FIG. 3A is a recovered image with high precision. FIG. 3B is a recovered image with artifacts. FIG. 3C is a recovered image with blurs. Further, the so-called artifact refers to data errors (error) or signal deformation generated in an observation or analysis phase.

As shown in FIG. 2A, in a spatial area, an observed image g(x, y) is obtained according to an original image f(x, y) and a PSF. In a frequency domain, a power spectrum Fr(u, v) of a recovered image is obtained by multiplying a power spectrum (power spectrum) G(u, v), after Fourier transformation (Fourier transformation), of the observed image by a power spectrum W(u, v) of the Wiener filter, and then a recovered image fr(x, y) is obtained by performing inverse Fourier transformation on the power spectrum Fr(u, v) of the recovered image.

The Wiener filter is used as one example of multiple image recovery methods, and is widely used (for example, with reference to patent document 2). In short, the Wiener filter is an inverse filter (inverse filter) that minimizes an error between the recovered image and the original image, and may be represented by using the formula shown in FIG. 2B. Herein, H represents Fourier transformation of a PSF. Sf and Sn are power spectrum distributions on the original image f and noise n on the image.

An image recovery result depends on precision of H, that is, depends on a degree of similarity between the recovery-purpose PSF and a PSF that is actually applied to the original image.

The recovered image with high precision shown in FIG. 3A is a recovered image obtained when a recovery filter generated by using an appropriate PSF is used, and more particular, when the recovery-purpose PSF is approximately consistent with the PSF actually applied to the original image.

The recovered image with artifacts shown in FIG. 3B is a recovered image obtained when a recovery filter generated by using an inappropriate PSF is used, and more particular, when the recovery-purpose PSF has a power spectrum higher than that of the PSF actually applied to the original image, thereby generating over-exposure state, caused by over-correction, of a code periphery.

The recovered image with blurs shown in FIG. 3C is a recovered image obtained when a recovery filter generated by using an inappropriate PSF is used, and more particular, when the recovery-purpose PSF has a power spectrum lower than that of the PSF actually applied to the original image.

Figure 4:
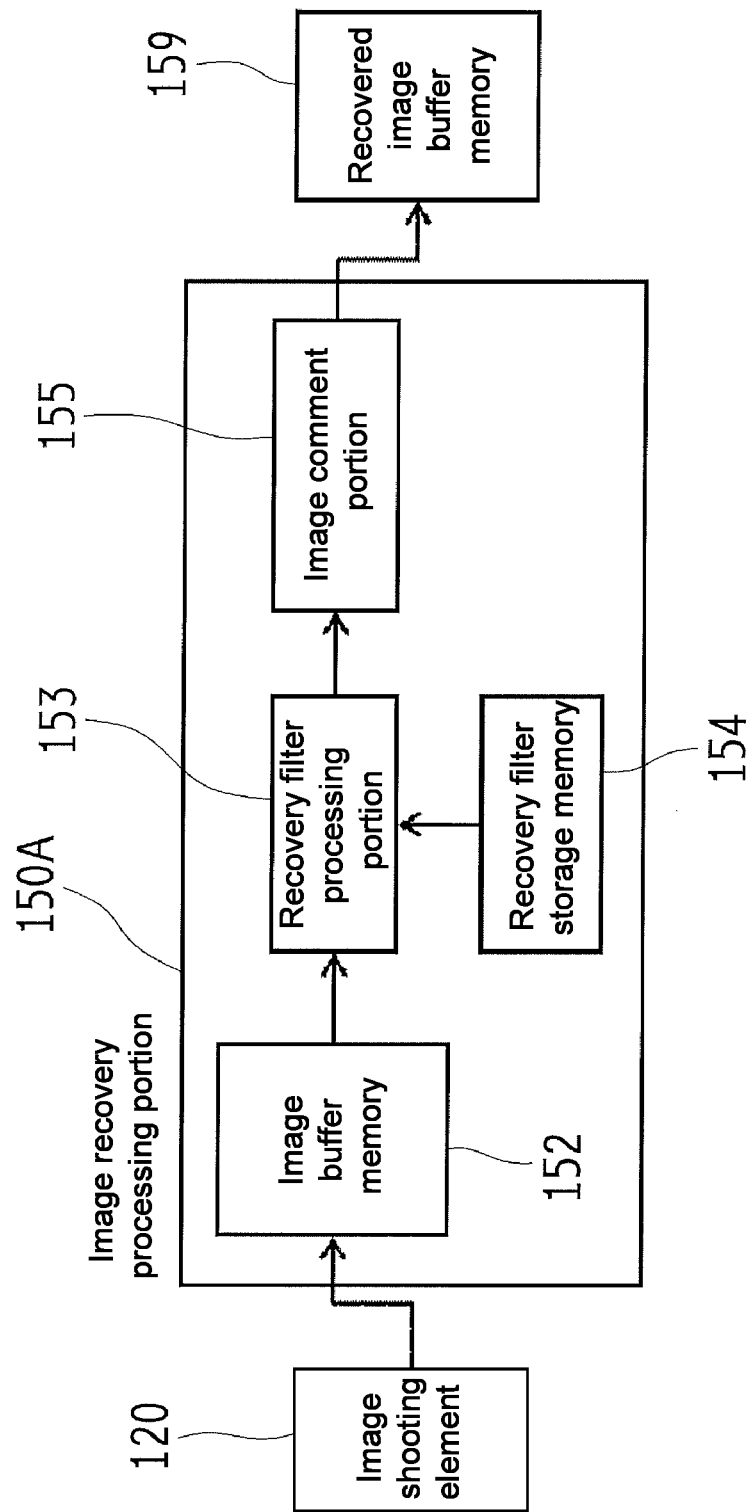
FIG. 4 is a block diagram that illustrates composition of an image recovery processing portion 150.
Figure 5:
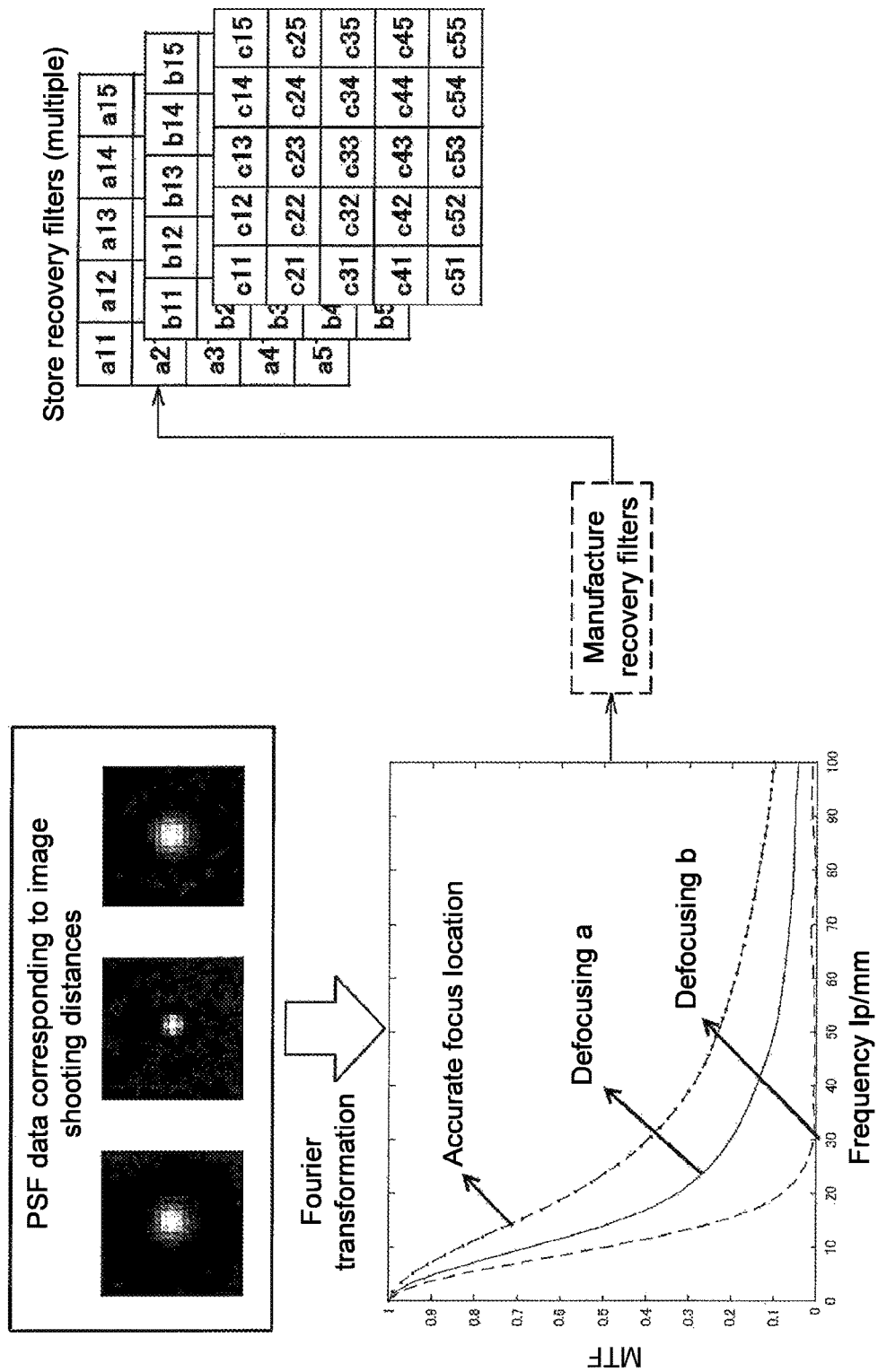
FIG. 5 is an explanatory diagram of a manufacturing relevant principle of a recovery filter in an image recovery processing portion 150A.
Figure 6A:
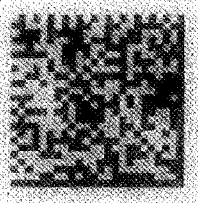
FIG. 6A to FIG. 6C are explanatory diagrams of middle candidate images.
Figure 6B:
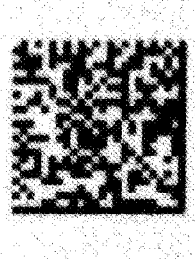
Figure 6C:
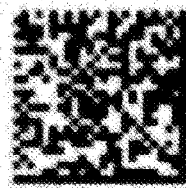

FIG. 4 is a block diagram that illustrates composition of an image recovery processing portion 150A. FIG. 5 is an explanatory diagram of a manufacturing relevant principle of a recovery filter in the image recovery processing portion 150A. FIG. 6A to FIG. 6C are explanatory diagrams of middle candidate images.

As shown in FIG. 4, the image recovery processing portion 150A includes: an image buffer memory 152, configured to receive image data from the image shooting element 220; a recovery filter storage memory 154, configured to store pre-calculated recovery filters; a recovery filter processing portion 153, configured to perform processing on the recovery filters by using the image data received by the image buffer memory 152 and the recovery filters stored in the recovery filter storage memory 154; and an image comment portion 155, configured to comment on a recovered image processed by the recovery filter processing portion 153, and send same to a recovered image buffer memory 159.

A summary of overall processing in the image recovery processing portion 150A is stated below (also with reference to FIG. 5).

1. Pre-manufacturing recovery filters respectively by using multiple PSFs corresponding to different distances, and pre-storing the recovery filters.

2. Photographing an image, and obtaining an input image.

3. Performing recovery processing on the input image respectively by using the stored recovery filters corresponding to the multiple PSFs. Obtaining multiple middle candidate images in this way.

4. Respectively commenting on profiles of the multiple middle candidate images by using two indexes: image sharpnesses and image artifacts.

5. Outputting a highest rated middle candidate image as a recovery processing result.

As shown in FIG. 5, when an image shooting distance is changed, Fourier transformation of a PSF corresponding thereto, that is, an absolute value of a modulation transfer function (modulation transfer function, MTF) also changes.

The PSF corresponding to the image shooting distance is used by means of offline processing; recovery filters are separately manufactured by using the method of the Wiener filter, and are pre-stored in the recovery filter storage memory 154.

Further, the processing may also be set to be performed by executing an image shooting program written into a program memory of a computer. The image shooting program may also be provided by a recording medium, for example, a compact disk read-only memory (Compact Disc Read-Only Memory, CD-ROM) that records the image shooting program, or a universal serial bus (Universal Serial Bus, USB) memory, or a network.

As shown in FIG. 6A to FIG. 6C, the middle candidate images are obtained by performing recovery on a photographed original blurred image by using different recovery filters prepared in advance according to distances. FIG. 6A is an example in which a blurred middle candidate image is left due to insufficient correction. FIG. 6B is an example in which correction on blurs can be performed appropriately, and no middle candidate image on a level (level) of artifacts occurs. FIG. 6C shows an example in which over-exposed middle candidate images with artifacts are generated due to over-correction, which can correct blurs.

Figure 7:
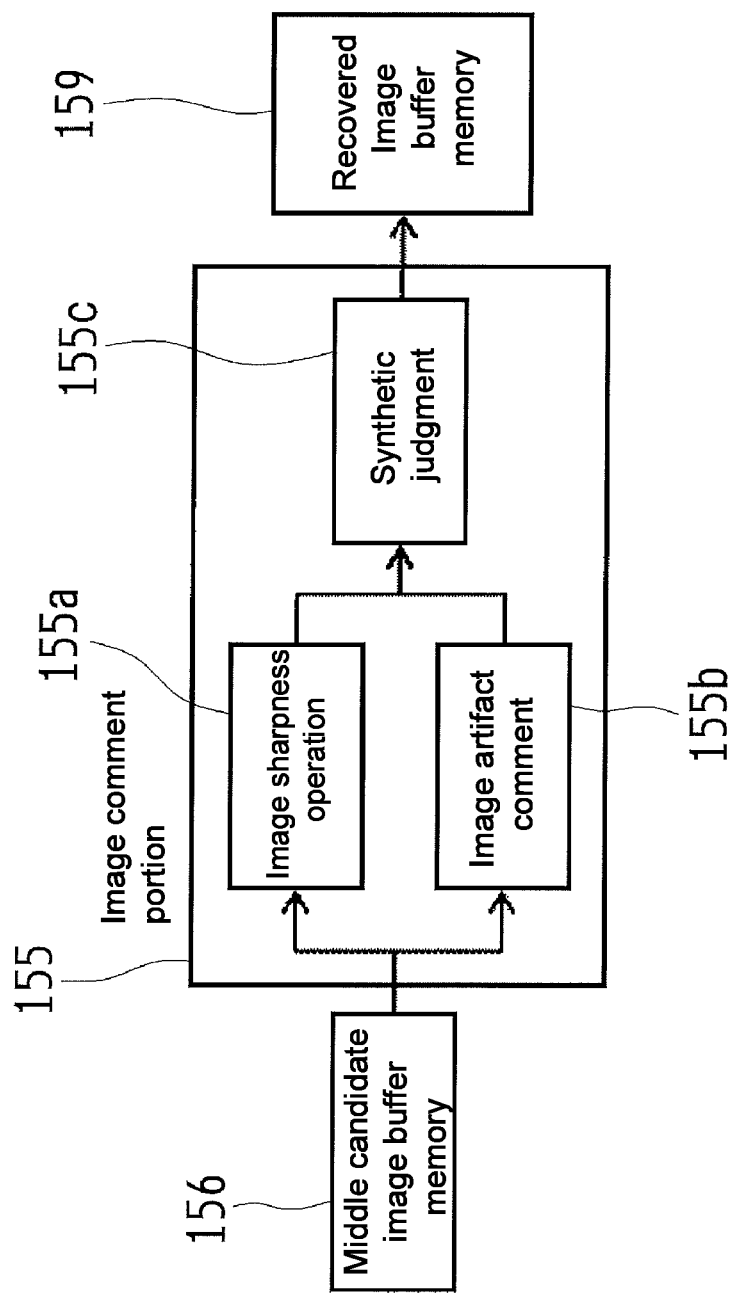
FIG. 7 is a block diagram that illustrates composition of an image comment portion 155 included in an image recovery processing portion 150A shown in FIG. 4.

FIG. 7 is a block diagram that illustrates composition of the image comment portion 155 included in the image recovery processing portion 150A shown in FIG. 4.

As show in FIG. 7, the image comment portion 155 performs image sharpness operation 155a and image artifact comment 155b on the middle candidate images received from a middle candidate image buffer memory 156, and then performs synthetic judgment 155c, uses a highest rated middle candidate image as a recovery processing result, and sends same to the recovered image buffer memory 159.

Figure 8:
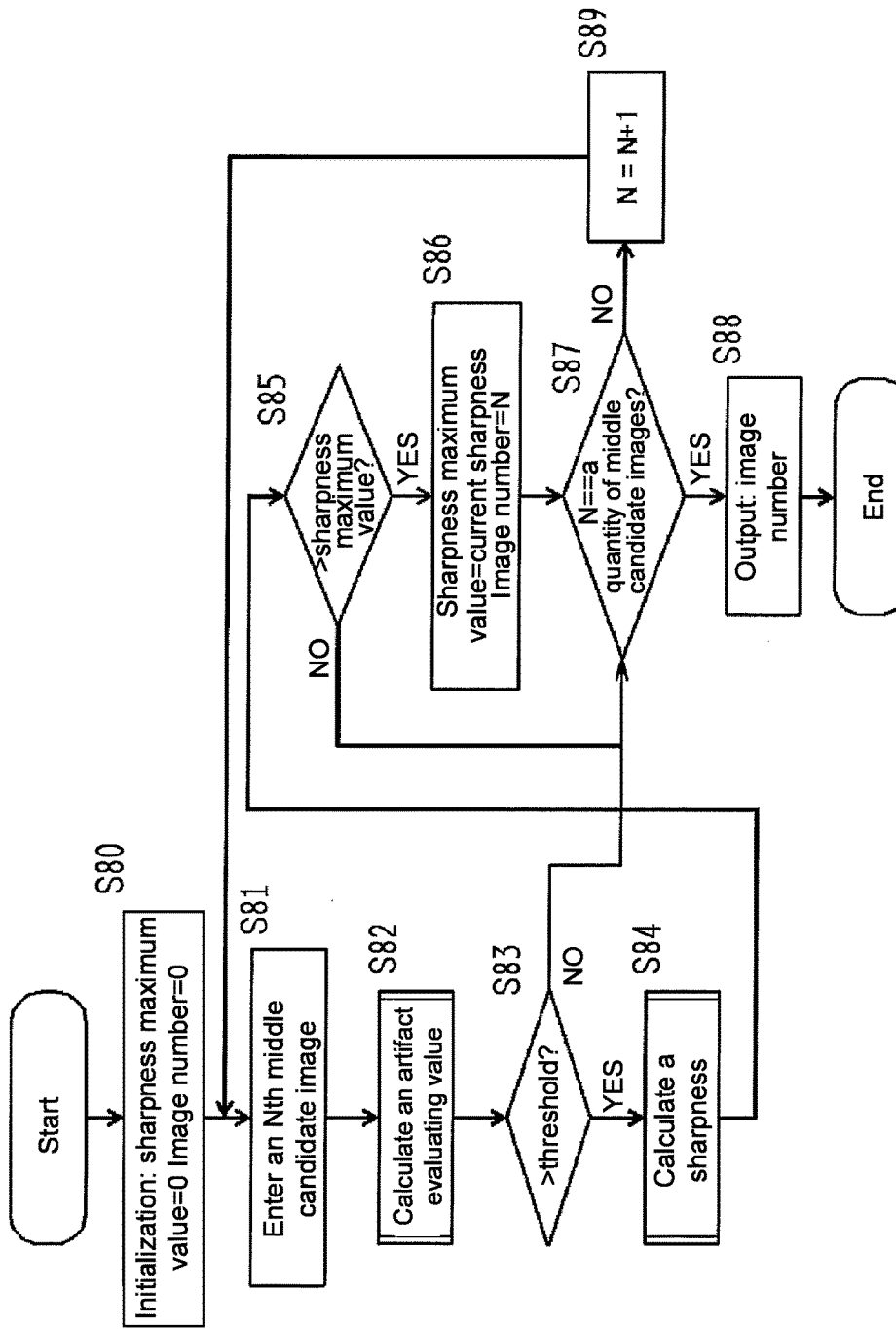
FIG. 8 is a flowchart of processing in an image comment portion 155.

FIG. 8 is a flowchart of processing in an image comment portion 155.

As shown in FIG. 8, a sharpness maximum value (MAX) and an image number are reset as 0 for initialization (step S80).

An Nth middle candidate image is entered (step S81), and calculation of an artifact evaluating value is executed (step S82).

Whether the artifact evaluating value is greater than a threshold is determined (step S83); if the result is no (NO), step S87 is entered.

If the result of the determining of step S83 is yes (YES), then after sharpness calculation is performed (step S84), whether the calculated sharpness is greater than a current sharpness MAX value is determined (step S85); if the result is no (NO), whether unprocessed middle candidate images are left is determined (step S87).

If the result of the determining of step S85 is yes (YES), then the sharpness MAX is updated as the current sharpness, and a value of a counter N at the moment is added to the image number.

Whether the value of the counter N is equal to a quantity of the middle candidate images is determined (step S87); if the result of the determining is yes (YES), then processing on all middle candidate images is completed, and therefore the processing ends with entering of the image number at the moment (step S88).

If the result of the determining of step S87 is no (NO), then unprocessed middle candidate images are left, and therefore after 1 is added to the value of the counter N (step S89), step S81 is returned to for repeated processing.

Figure 9:
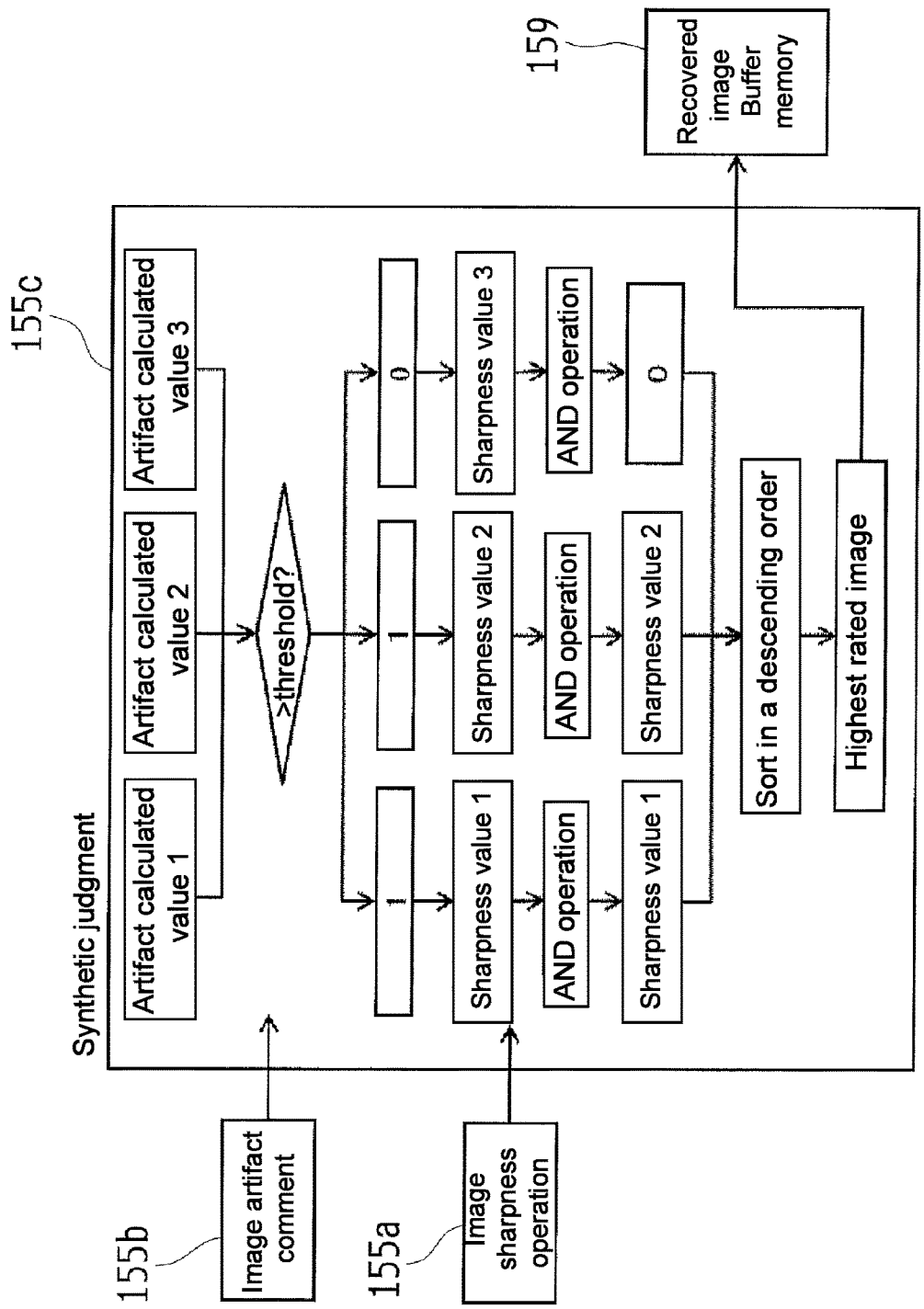
FIG. 9 shows a modified example of processing in an image comment portion 155, and is a flowchart of parallel processing of using three middle candidate images as input images and performing concretization.

FIG. 9 shows a modified example of processing in the image comment portion 155, and is a flowchart of parallel processing of using three middle candidate images as input images and performing concretization. The middle candidate images respectively correspond to FIG. 6A to FIG. 6C. Further, detailed description of each step of the processing is omitted.

The following represents an example of a sharpness calculation result of middle candidate images.

A point sharpness value of a distance a is 0.973596 (pts sharpness value is 0.973596).

A point sharpness value of a distance b is 1.161603 (pts sharpness value is 1.161603).

A point sharpness value of a distance c is 1.183418 (pts sharpness value is 1.183418).

In addition, the following represents an example of an artifact determining result. If a threshold T is not reached, the result is 1 (no artifact); and if the result exceeds the threshold T, the result is 0 (an artifact is generated).

The distance a 1

The distance b 1

The distance c 0

A result of the foregoing content is that: an image in which an artifact is generated is excluded, and an image with a highest sharpness is selected. That is, a highest rated image is as follows.

The point sharpness value of the distance b is 1.161603 (pts sharpness value is 1.161603).

Figure 10A:
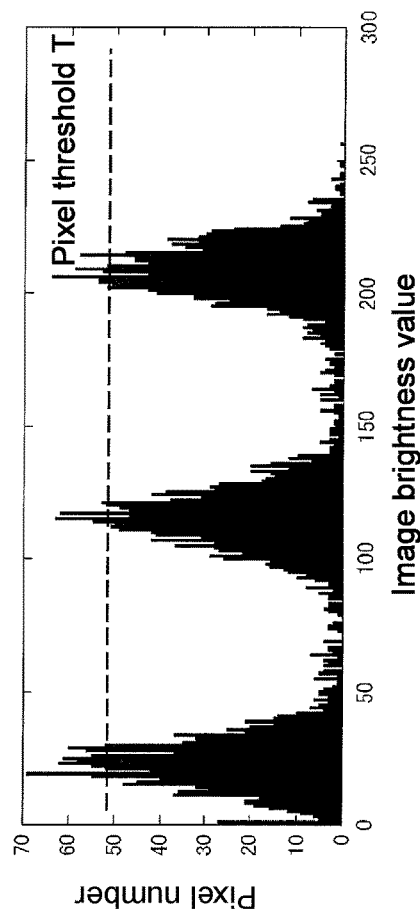
FIG. 10A and FIG. 10B are explanatory diagrams of a principle of artifact comments of an image.
Figure 10B:
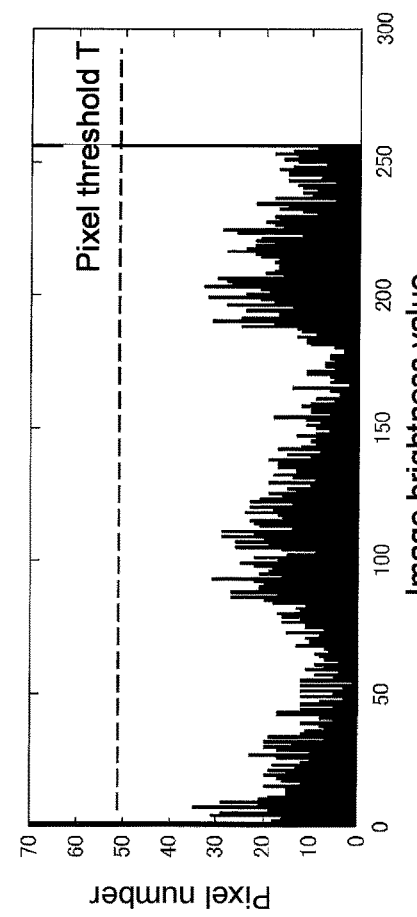

FIG. 10A and FIG. 10B are explanatory diagrams of a principle of artifact comments of an image. FIG. 10A is a histogram of image brightness values of a recovered image generally without artifacts. FIG. 10B is a histogram of image brightness values of a recovered image with artifacts.

As shown in the histograms, an horizontal axis represents pixel brightness values; a range of brightness values of 8-bit data is 0 to 255; and a vertical axis represents a quantity of pixels having each brightness value (pixel number (pixel number)). Compared with the recovered image generally without artifacts, in the recovered image with artifacts, peak values can be clearly seen at two sites: a maximum value (MAX) (a brightness value=255) and a minimum value (MIN) (a brightness value=0) of the histogram. If a sum of pixel numbers having brightness values ranging from 250 to 255 is greater than the fixed threshold T, then it is determined that an artifact exists.

Figure 11:
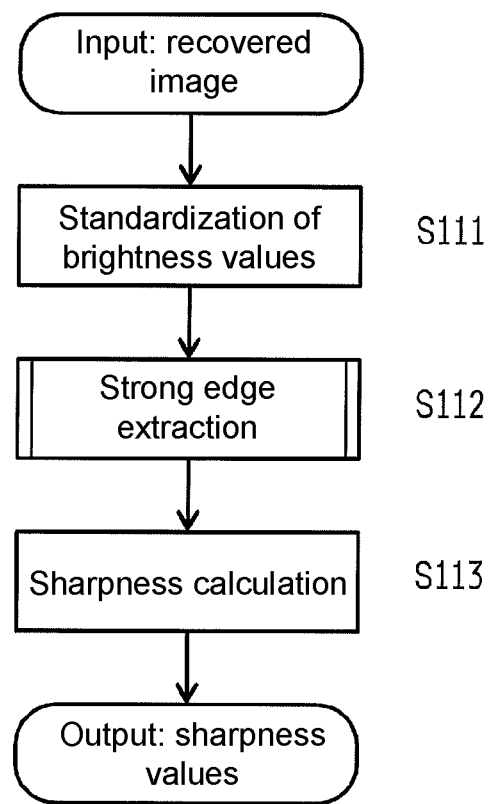
FIG. 11 is a flowchart that illustrates entire image sharpness operation.

FIG. 11 is a flowchart that illustrates entire image sharpness operation.

As shown in FIG. 11, when the recovered image is entered, first, brightness values are standardized into a range of 0 to 1 (step S111). In standardization of image brightness values, the following formula is used.

Converted brightness value=(brightness value before conversion−minimum value of brightness before conversion)/(maximum value of brightness before conversion−minimum value of brightness before conversion)

Secondly, "strong edge extraction" is executed (description is provided below with reference to FIG. 12) (step S112).

Finally, sharpnesses are calculated (step S113), and sharpness values are output.

The non-patent document 2 provides a profile (image clarity (Image Clarity)) comment index of an image sharpness: a measurement point sharpness (Point sharpness). However, because direct calculation needs to be performed on all pixels of a to-be-commented input image, robustness (robustness) is lost in the following three cases.

1) Image Content

When photographed objects are different, for example, comparison between scenery and human images cannot be performed.

2) Image Brightness Values

Even if the same image content exists, comparison cannot be performed in a case in which brightnesses are different.

3) Noise Level (Noise Level)

Even if the image content is the same, comparison cannot be performed in a case in which noise levels are different.

In the image sharpness operation shown in FIG. 11, the problem is improved by standardizing image brightness values, and automatically extracting a strong edge.

Figure 12:
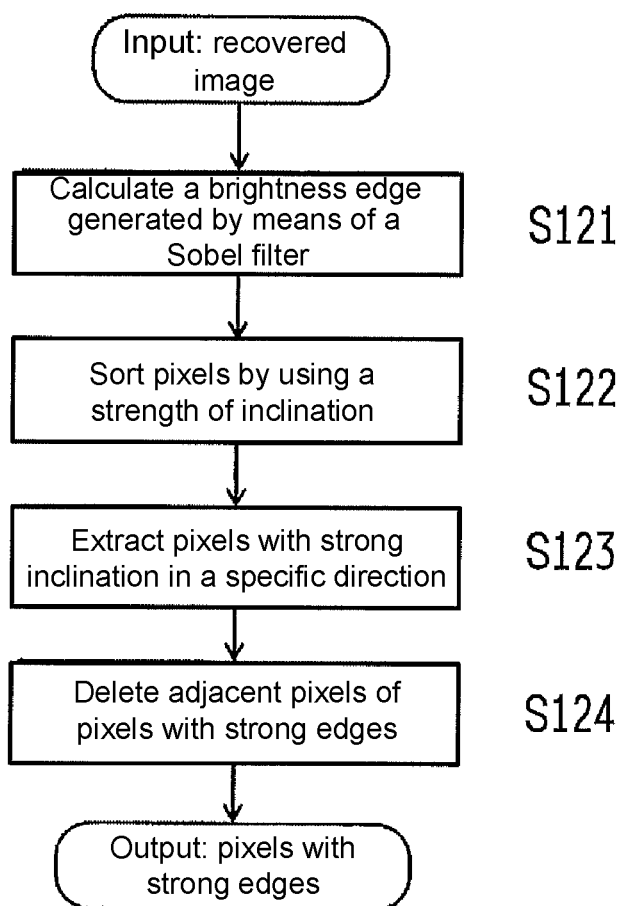
FIG. 12 is a flowchart that illustrates a strong edge extraction method.

FIG. 12 is a flowchart that illustrates a strong edge extraction method.

As shown in FIG. 12, first, a brightness edge generated by means of a Sobel (Sobel) filter is calculated (step S121).

Secondly, pixels are sorted according to a strength of inclination (step S122).

Then, to extract an exact strong edge, pixels with strong inclination in a specific direction are extracted (step S123). For example, when a photographed object enters horizontally or vertically on an image, a direction of inclination is considerably limited. Pixels whose inclination increases due to noise may be excluded by means of the judgment.

In addition, to reduce effects of, for example, nonuniformity of image brightness values, to extract edge pixels without faculas in the entire photographed object as uniformly as possible, adjacent pixels of pixels with strong edges are deleted (step S124). If a particular pixel is determined to have a strong edge, processing is performed by determining that pixels at nearby eight points (a 3×3 area) do not have strong edges.

FIG. 13A to FIG. 13F are diagrams of blurred images respectively shot at an accurate focus location and at a location separated from the accurate focus location in a comparative example, a recovered image of an existing method, and a recovered image of the invention. The image in the left column corresponds to the accurate focus location, and the image in the right column corresponds to the location separated from the accurate focus location.

FIG. 13A and FIG. 13B are photographed blurred images.

In the existing method for performing recovery based on a PSF at the accurate focus location, compared with the recovered image at the accurate focus location shown in FIG. 13C, a profile of the recovered image at the location separated from the accurate focus location shown in FIG. 13D obviously decreases.

On the contrary, according to the invention that performs recovery based on an optimal PSF obtained by means of image sharpnesses, compared with the recovered image at the accurate focus location shown in FIG. 13E, a profile of the recovered image at the location separated from the accurate focus location shown in FIG. 13F does not decrease as such.

According to the invention, an image with an optimal profile is selected without having to perform distance derivation, and therefore, even if the location is separated from the accurate focus location, a result similar to recovery precision at the accurate focus location is also obtained.

Further, in cases in which a motion blur (motion blur) exists, that is, a photographed object jitters, or within an image shooting range or a field range, an optical system in which PSFs change due to image height may also apply processing the same as the foregoing processing in a case in which the PSFs are known although the PSFs change, so as to obtain the same effect.

<Implementation Manner 2>

In the implementation manner 1, sharpness calculation is performed by automatically extracting strong edge points on an entire image. In the implementation manner 2, it is set to comment on some images of images, for example, a code image or a pupil detection image, of pre-known objects.

Figure 14:
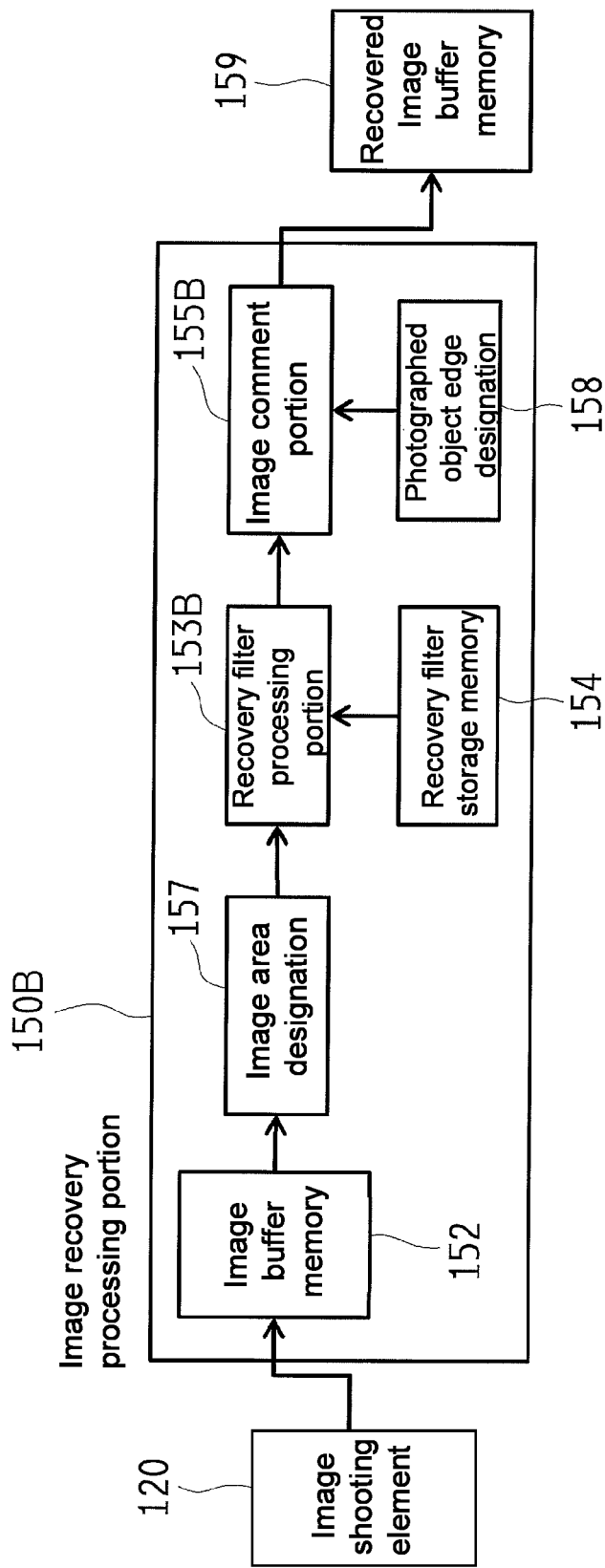
FIG. 14 is a block diagram that illustrates composition of an image recovery processing portion 150B of an image shooting apparatus of implementation manner 2 of the invention.

FIG. 14 is a block diagram that illustrates composition of an image recovery processing portion 150B of an image shooting apparatus of the implementation manner 2 of the invention. Further, the image recovery processing portion 150B corresponds to the image recovery processing portion 150A of the implementation manner 1 (with reference to FIG. 4).

As shown in FIG. 14, in the image recovery processing portion 150B, compared with the image recovery processing portion 150A of the implementation manner 1 (with reference to FIG. 4), an image area designation 157 is supplemented between an image buffer memory 152 and a recovery filter processing portion 153B, and a photographed object edge designation 158 on an image comment portion 155B is supplemented. Further, with the supplement of the image area designation 157 and the photographed object edge designation 158, a portion of processed content of a recovery filter processing portion 153 of the image recovery processing portion 150A and a portion of processed content of an image comment portion 155 of the image recovery processing portion 150A are respectively modified so as to form the recovery filter processing portion 153B and the image comment portion 155B.

A processing speed may be further accelerated by means of area definition of an image, threshold adjustment of a direction of inclination, or manual edge point designation. Because undesired areas are excluded, false detection and the like can be reduced.

In addition, according to the use purpose, high-precision recovery may also be performed on only a portion of an image as long as the composition and processing flow of the implementation manner 1 are followed. For example, it is effective only in cases, for example, where a central portion or a peripheral portion in a photographed image is used as a photographed object.

<Implementation Manner 3>

In the implementation manner 1 or the implementation manner 2, black and white images are processed. However, color images are used as processing objects in the implementation manner 3. For example, if an image is a red green blue (Red Green Blue, RGB) image, then a high-precision recovered image processed according to an RGB channel is synthesized, and therefore the same effect can also be achieved for the RGB image.

Figure 15:
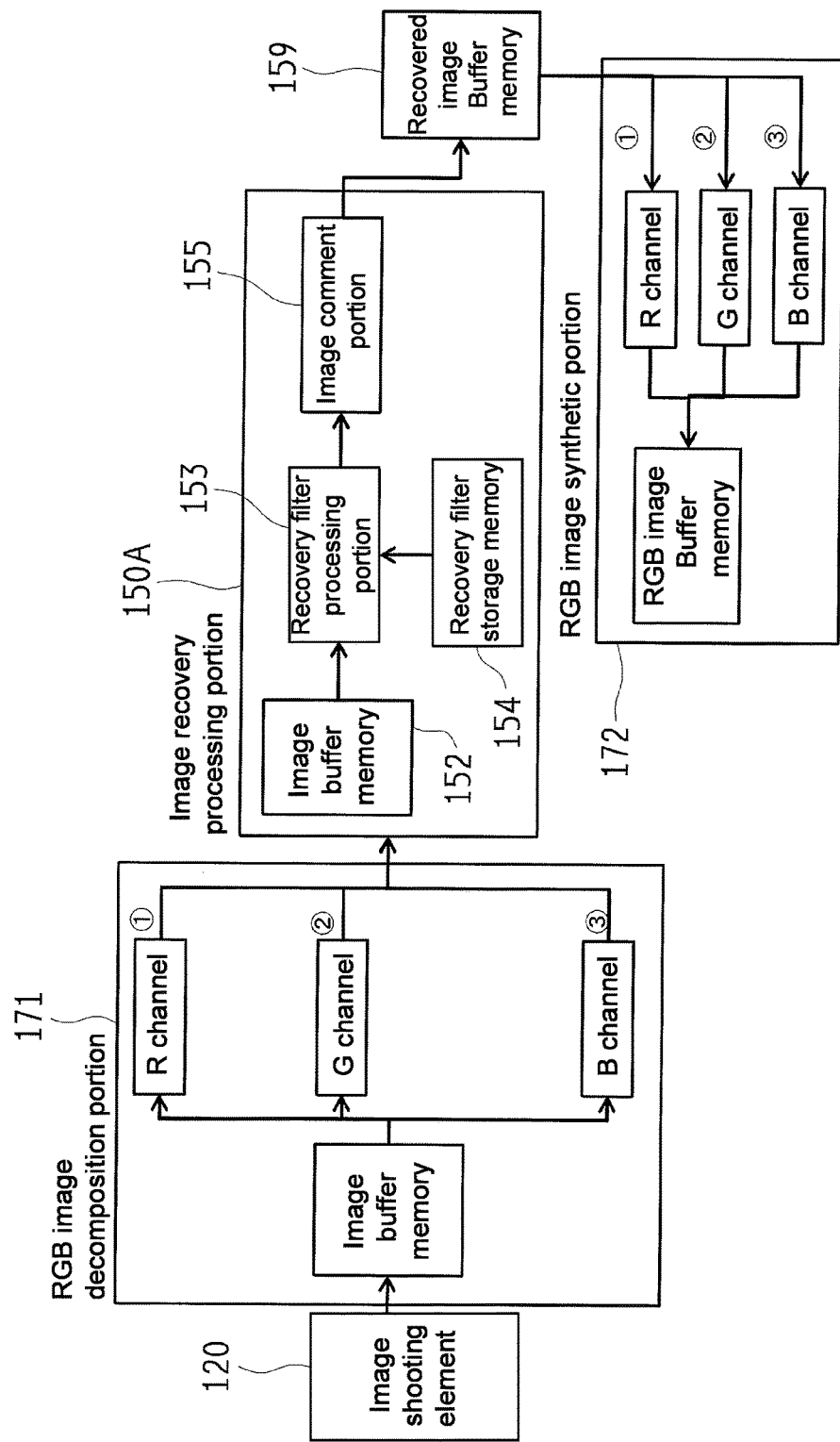
FIG. 15 is a block diagram that illustrates a main portion, different from implementation manner 1, in an image shooting apparatus of implementation manner 3 of the invention.
Figure 16A:
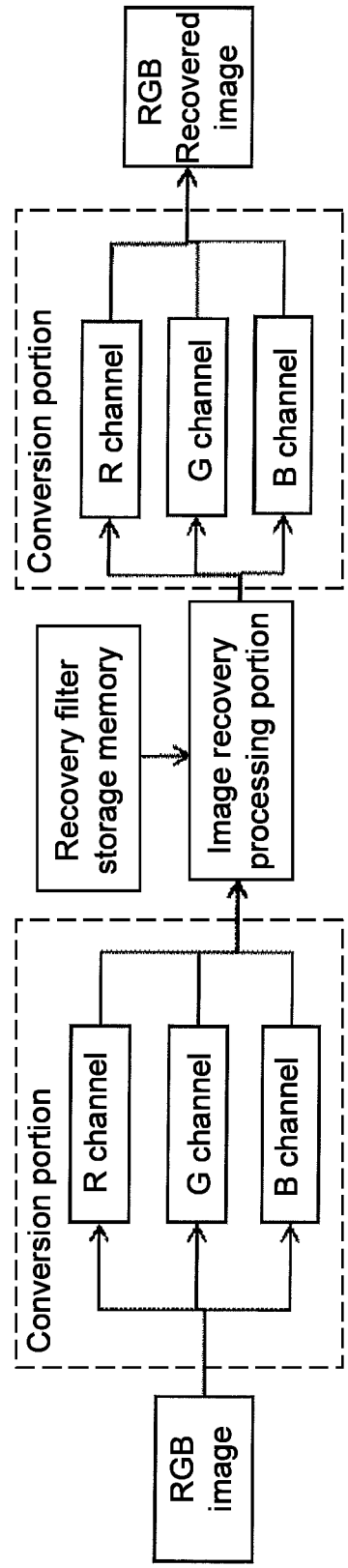
FIG. 16A and FIG. 16B are block diagrams that exemplify a general RGB image recovery method.
Figure 16B:
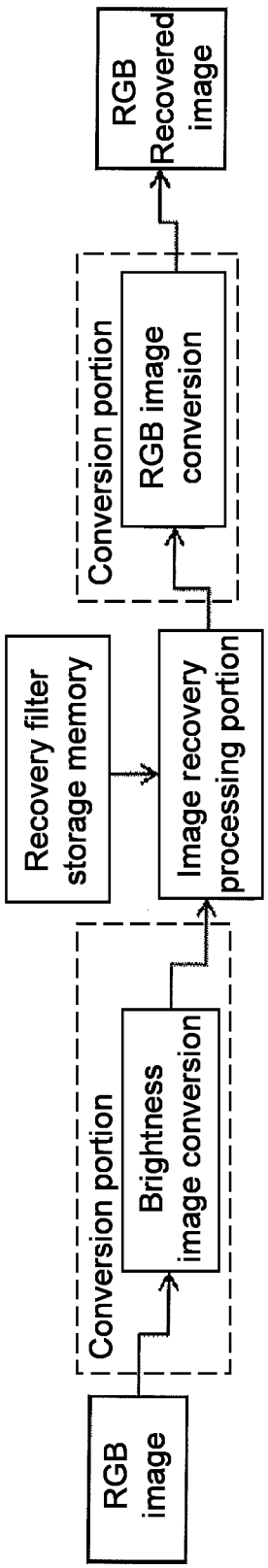
Figure 17:
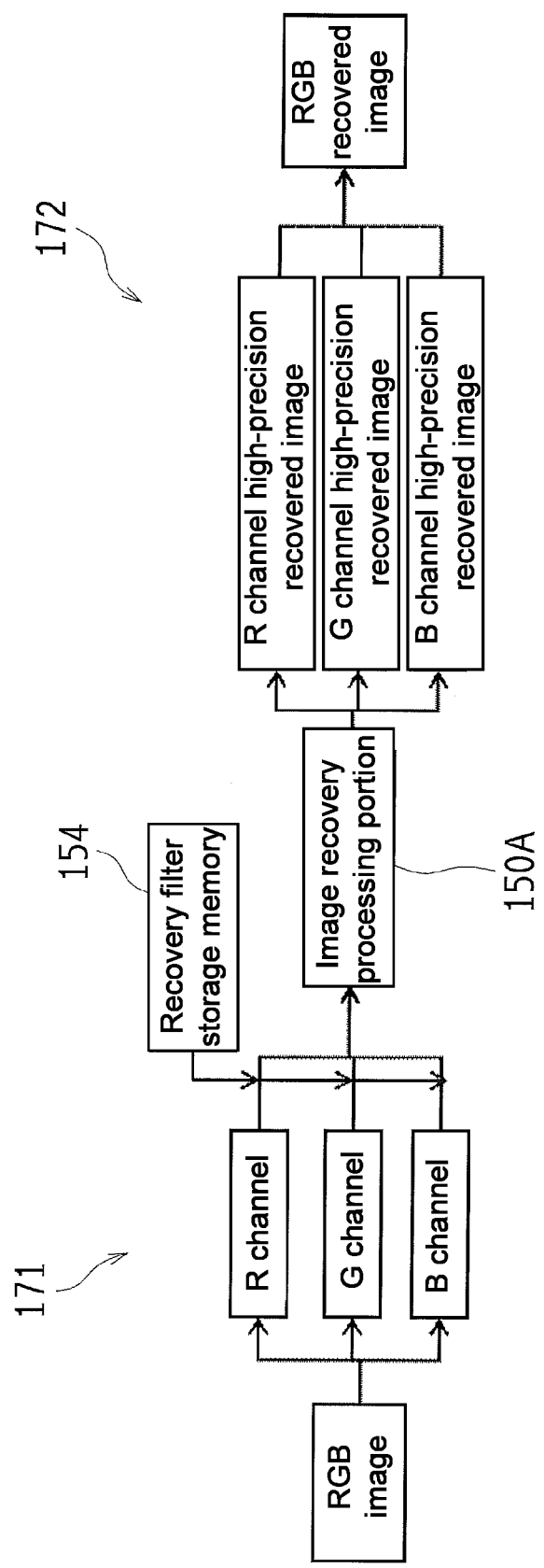
FIG. 17 is a block diagram that illustrates an RGB image recovery method of implementation manner 3.

FIG. 15 is a block diagram that illustrates a main portion, different from implementation manner 1, in an image shooting apparatus of implementation manner 3 of the invention. FIG. 16A and FIG. 16B are block diagrams that exemplify a general RGB image recovery method. FIG. 17 is a block diagram that illustrates an RGB image recovery method of implementation manner 3.

As shown in FIG. 15, in the implementation manner 3, an RGB image decomposition portion 171 is supplemented between an image shooting element 120 and an image recovery processing portion 150A, and an RGB image synthetic portion 172 is supplemented in front of a recovered image buffer memory 159.

In a case of the general RGB image recovery method shown in FIG. 16A or FIG. 16B, recovery is performed on a converted brightness image/RGB channel based on one PSF. However, originally, PSFs of channels R, G, and B are subtly different from each other, and therefore if recovery is performed by using only one PSF, the effect that the PSFs of the channels R, G, and B are different is generated.

On the contrary, in the implementation manner 3, as shown in FIG. 17, in the channels R, G, and B, an optimal PSF is separately obtained by means of an image sharpness, so as to obtain a high-precision recovered image, thereby obtaining a synthetic RGB recovered image with higher precision.

Further, the invention is not limited to the R, G, and B channels only, for example, an infrared radiation (Infrared Radiation, IR) channel may also be supplemented.

<Implementation Manner 4>

In the foregoing implementation manners, image comments upon multiple middle candidate images that are respectively recovered by using multiple recovery filters are provided. In the implementation manner 4, it is set that comments are made based on a blurred image before recovery and then a recovery filter is selected.

Figure 18:
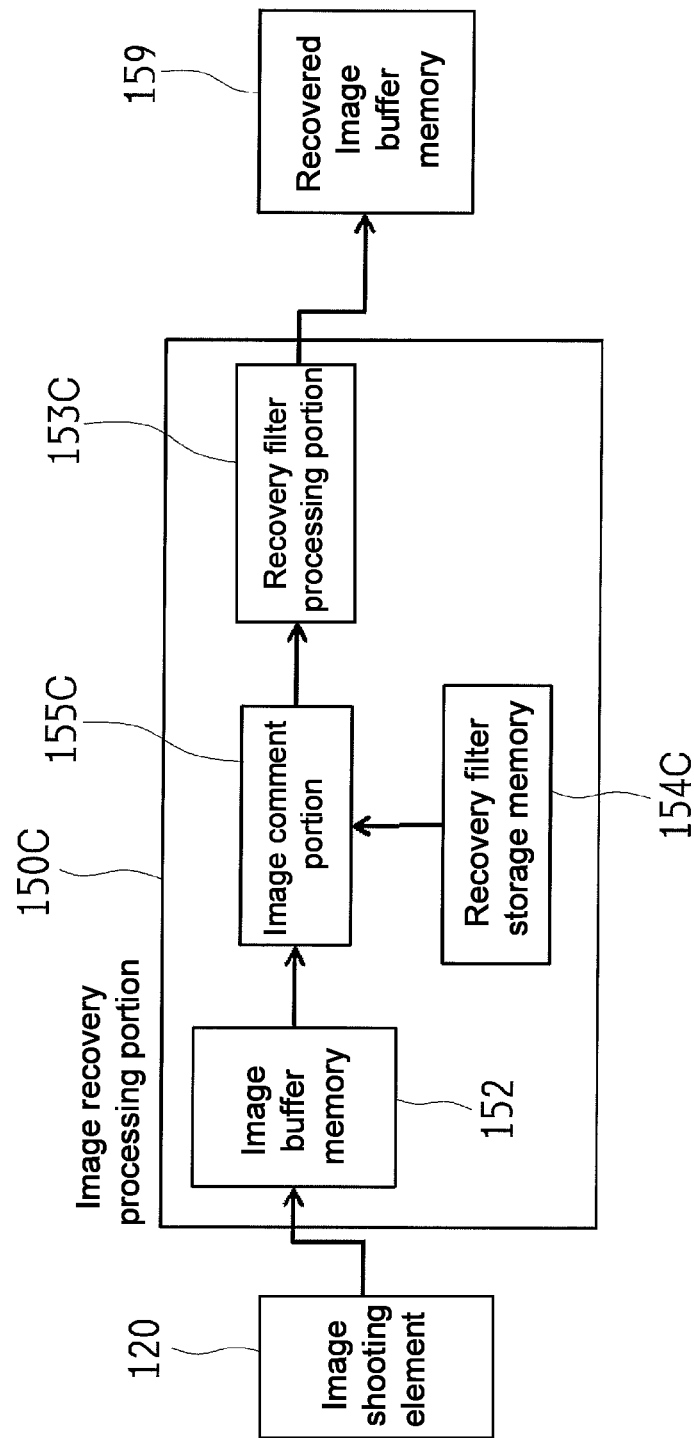
FIG. 18 is a block diagram that illustrates composition of an image recovery processing portion 150C of an image shooting apparatus of implementation manner 4 of the invention.
Figure 19:
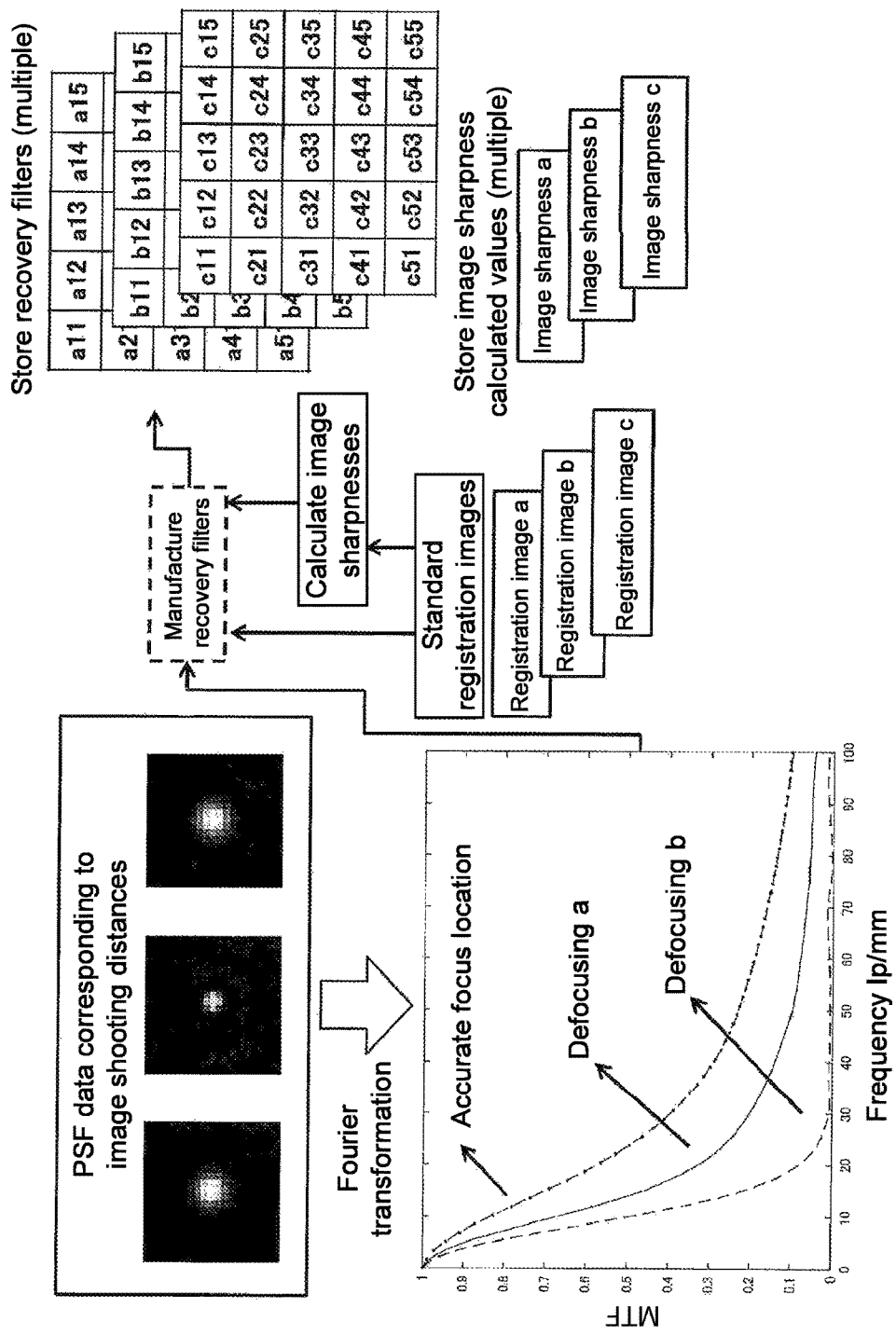
FIG. 19 is an explanatory diagram of a manufacturing relevant principle of a recovery filter, and the like in an image recovery processing portion 150C.
Figure 20A:
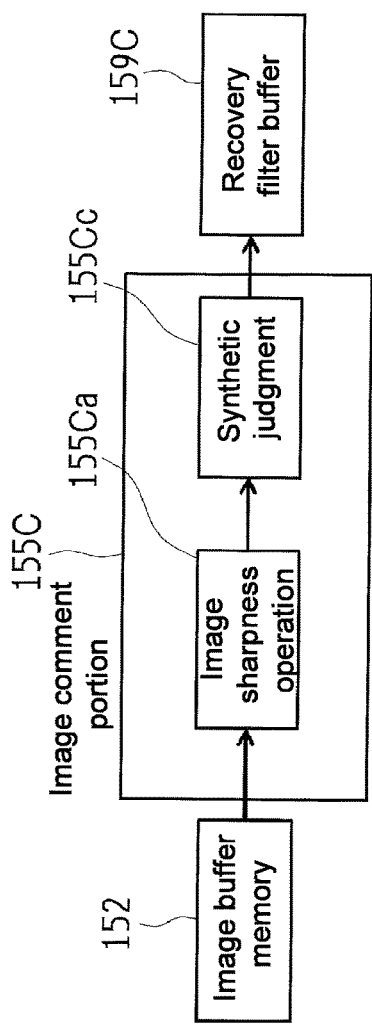
FIG. 20A is a block diagram that illustrates composition of an image comment portion 155C included in an image recovery processing portion 150C shown in FIG. 18.
Figure 20B:
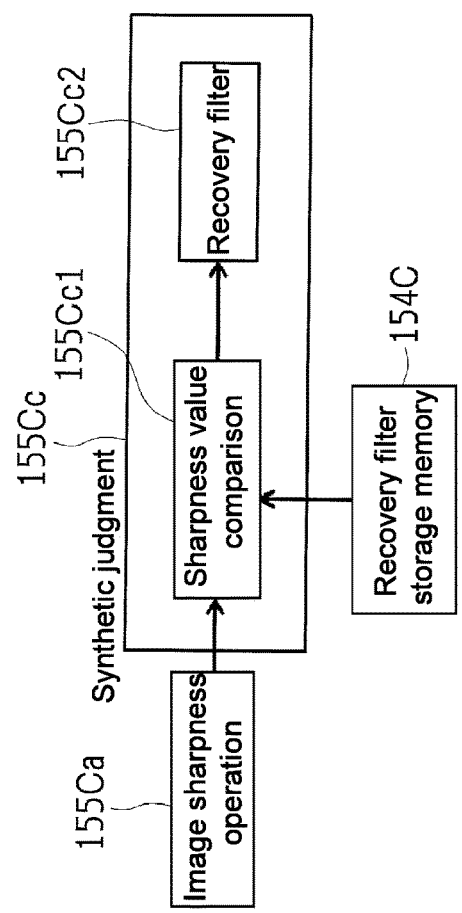
FIG. 20B is a block diagram that illustrates composition of a synthetic judgment 155Cc included in an image comment portion 155C of FIG. 20A.

FIG. 18 is a block diagram that illustrates composition of an image recovery processing portion 150C of an image shooting apparatus of implementation manner 4 of the invention. FIG. 19 is an explanatory diagram of a manufacturing relevant principle of a recovery filter, and the like in the image recovery processing portion 150C. FIG. 20A is a block diagram that illustrates composition of an image comment portion 155C included in the image recovery processing portion 150C shown in FIG. 18. FIG. 20B is a block diagram that illustrates composition of a synthetic judgment 155Cc included in the image comment portion 155C of FIG. 20A.

As shown in FIG. 18, in the image recovery processing portion 150C, compared with the image recovery processing portion 150A (with reference to FIG. 4) of the implementation manner 1, an order of a recovery filter processing portion 153C and the image comment portion 155C is changed. Further, with the order change, a portion of processed content of a recovery filter processing portion 153 of the image recovery processing portion 150A, a portion of processed content of a recovery filter storage memory 154 of the image recovery processing portion 150A, and a portion of processed content of an image comment portion 155 of the image recovery processing portion 150A are respectively modified so as to form the recovery filter processing portion 153C, a recovery filter storage memory 154C, and the image comment portion 155C.

A summary of overall processing in the image recovery processing portion 150C is stated below (also with reference to FIG. 19).

1. Pre-using multiple PSFs corresponding to multiple different distances to manufacture, in pairs, recovery filters and standard registration images and image sharpnesses corresponding thereto. Further, the standard registration images refer to representative blurred images photographed at various distances.

2. Photographing an image, and obtaining an input image.

3. For the input image, commenting on profiles of the blurred images by using an index of image sharpnesses.

4. Selecting a recovery filter paired with an image sharpnesses closest to values of image sharpnesses corresponding to the standard registration images as a recovery filter for input image recovery.

5. Performing recovery processing by using the recovery filter, and outputting same as a recovery processing result.

As shown in FIG. 20A, in the image comment portion 155C, after image sharpness operation 155Ca on image data received from an image buffer memory 152 is performed, synthetic judgment 155Cc is performed, and a recovery processing result is sent to a recovery filter buffer 159C.

The synthetic judgment 155Cc, as shown in FIG. 20B is to perform sharpness value comparison 155Cc1 based on a result of the image sharpness operation 155Ca, and recovery filters and standard registration images and image sharpnesses corresponding thereto stored in the recovery filter storage memory 154C, and a recovery filter 155Cc2 is selected.

The standard registration images (multiple) are blurred images before recovery corresponding to image shooting distances. The standard registration images have different blur degrees, and therefore calculated image sharpnesses are also different.

Different from the implementation manner 1, more than recovery filters should be prepared in advance in an offline manner. Image sharpnesses corresponding thereto are also prepared in pairs in advance.

A method for the synthetic judgment is to compare sharpnesses of photographed images with sharpnesses of the standard registration images stored in the recovery filter storage memory after the sharpnesses of photographed images are calculated in an online manner. Because the image sharpnesses and recovery filters are prepared in pairs, subsequently, a recovery filter corresponding to a closest image sharpness is used to perform recovery.

Further, under the condition of not departing from the purport or main characteristics of the invention, the invention may be implemented in other various forms. Therefore, the implementation manners or embodiments are only exemplary on all aspects, and cannot be definitively explained. The scope of the invention is disclosed by the claims, and is not constrained by body text of the description. In addition, deformations or changes within an equivalent scope of the claims are all content within the scope of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image shooting apparatus comprising:
   an optical system, comprising one or more than one lenses or the lens and an optical element;
   an image shooting element, configured at a location further to the rear of the optical system;
   an image recovery processing portion, configured to perform image processing and recovery processing on image data obtained by the image shooting element; and
   a recovered image output portion, configured to output an image recovered by the image recovery processing portion;
   wherein the image recovery processing portion comprises:
   a recovery filter storage portion, configured to store multiple recovery filters pre-manufactured by using multiple point spread functions corresponding to multiple different distances;
   a recovery filter processing portion, configured to obtain multiple middle candidate images respectively recovered by using the multiple recovery filters according to the image data; and
   an image comment portion, configured to separately comment on profiles of the multiple candidate images to output an optimal middle candidate image as a recovery processing result,
   wherein the image recovery processing portion further comprises:
   an image area designation portion, configured to designate an image area, used as an object, in the recovery filter processing portion; and
   an excluded area designation portion, configured to designate an area, which should be excluded from the object by the image comment portion.

2. The image shooting apparatus according to claim 1, wherein
   the image recovery processing portion synthesizes recovered images categorized by color signals for each of the color signals.

3. The image shooting apparatus according to claim 1, wherein:
   the image recovery processing portion comprises a Wiener filter or an FIR filter manufactured by patterns, incident to the image shooting element by means of diffusion, of a point image function.

4. An image shooting apparatus, comprising:
   an optical system, comprising one or more than one lenses or the lens and an optical element;
   an image shooting element, configured at a location further to the rear of the optical system;
   an image recovery processing portion, configured to perform image processing and recovery processing on image data obtained by the image shooting element; and
   a recovered image output portion, configured to output an image recovered by the image recovery processing portion;
   wherein the image recovery processing portion comprises:
   a recovery filter storage portion, configured to store standard registration images and image sharpnesses corresponding thereto and multiple recovery filters pre-manufactured by using multiple point spread functions corresponding to multiple different distances, wherein the standard registration images are representative blurred images photographed at various distances; and an image comment portion, configured to select a recovery filter based on a standard registration image having an image sharpness closest to an image sharpnesses obtained by commenting on a profile of the image data; and a recovery filter processing portion, configured to obtain a recovered image by using the selected recovery filter.

5. An image shooting method comprising:

an image shooting process: photographing a photographed object; and an image recovery processing process: performing image processing and recovery processing on image data obtained in the image shooting process;

wherein the image recovery processing process comprises:

a recovery filter storage process: storing multiple recovery filters pre-manufactured by using multiple point spread functions corresponding to multiple different distances;

a recovery filter processing process: obtaining multiple middle candidate images respectively recovered by using the multiple recovery filters according to the image data; and an image comment process: separately commenting on profiles of the multiple candidate images to output an optimal middle candidate image as a recovery processing result, wherein the image recovery processing process further comprises: designating an image area, used as an object, in the recovery filter processing process; and designating an area, which should be excluded from the object in the image comment process.

6. A non-transitory recording medium, recording an image shooting program, wherein a computer is enabled to read the non-transitory recording medium and execute the image shooting program to perform the image shooting method according to claim 5.

7. An image shooting method, comprising:

an image shooting process: photographing a photographed object; and an image recovery processing process: performing image processing and recovery processing on image data obtained in the image shooting process; and the image recovery processing process comprises:

a recovery filter storage process: storing standard registration images and image sharpnesses corresponding thereto and multiple recovery filters pre-manufactured by using multiple point spread functions corresponding to multiple different distances, wherein the standard registration images are representative blurred images photographed at various distances; and an image comment process: selecting a recovery filter based on a standard registration image having an image sharpness closest to an image sharpnesses obtained by commenting on a profile of the image data; and a recovery filter processing process: obtaining a recovered image by using the selected recovery filter.

8. A non-transitory recording medium, recording an image shooting program, wherein a computer is enabled to read the non-transitory recording medium and execute the image shooting program to perform the image shooting method according to claim 7.

\* \* \* \* \*